UNITED STATES PATENT OFFICE.

AMOS D. LUFKIN, OF CLEVELAND, OHIO.

IMPROVEMENT IN PREPARING HIDES.

Specification forming part of Letters Patent No. 29,392, dated July 31, 1860.

*To all whom it may concern:*

Be it known that I, AMOS D. LUFKIN, of Cleveland, in the county of Cuyahoga and State of Ohio, have invented new and useful Improvements in Depilating or Removing the Hair from Skins and Hides Preparatory to Tanning; and I do hereby declare that the following is a full and complete description of the materials used, manner of compounding them, and mode of use.

The nature of my invention relates to a compound that acts specifically upon the hair-glands, so as to loosen the hairs without injury to other parts of the skin, which is left in such a soft and natural state that simply by soaking it in clean water for a few hours, with the usual working upon the beam, the ordinary process of bating may be dispensed with.

My depilating liquid is prepared in the following-named manner: I take one part, by weight, of soda-ash (NaO) and dissolve it carefully in a stoneware vessel by adding soft hot water, making a saturated solution of the same. I then add thereto an equal quantity of sulphur (S)—that is to say, if I use one pound of soda-ash I use one pound of sulphur. These are mixed together by stirring until the whole forms a thick pasty mass, which should be frequently stirred for several hours, and if the mass inclines to crystalize or become hard more water should be added until the whole assumes the form and consistence of a thick mortar, and it is ready of use, as hereinafter specified. It may here be proper to remark that the exact proportions herein named are not essential; but they may be varied according to the purity or strength of the ingredients named. I now take ten parts, by weight, —say, ten pounds—of good unslaked lime, (CaO,) and place it in a vessel that will contain about fifteen gallons, (a common half-barrel tub answers a good purpose,) and gradually moisten it with water until it begins to slake. I then add two pounds of the sulphur and soda compound (calculated free from water) to the hot and slaking lime, adding water gradually and stirring constantly till the whole is sufficiently liquid to be poured from the vessel without difficulty, which will require from ten to twelve gallons of water. This compound, which I denominate the "hyposulphite of soda and lime," is now ready to be reduced to a proper strength for use. In order to do this, put into a suitable vat as many gallons of soft water as there are ounces of the hyposulphite compound to be used, $(10\ CaO + 2\ NaOS = 192$ ounces.) Therefore 192 gallons of water should be used. But the strength may be varied slightly in either direction without producing any other effect except to prolong or shorten the process of depilation. Green calf skins or hides that have never been dried or salted will become sufficiently acted upon in from six to thirty-six hours; but skins and hides will not be injured by remaining in the depilating liquid for a week or more.

It is well to test the strength of the liquid by the use of an instrument, (a hydrometer,) and thus a uniform standard of strength obtained by which the operator may be guided in the subsequent strengthening of the liquid. Skins or hides that have been salted will require a stronger liquor and more time than those that are wholly green. In this, as in other departments of art, experience must be consulted.

After skins or hides are unhaired they can be sufficiently freed from excess of alkali for the tan by frequent washing in water and working upon the beam.

What I claim as my invention, and desire to secure by Letters Patent, is—

The composition made as herein set forth, and for the purpose described.

A. D. LUFKIN.

Witnesses:
   W. H. BURRIDGE,
   HENRY VOTH.